Figure 1:
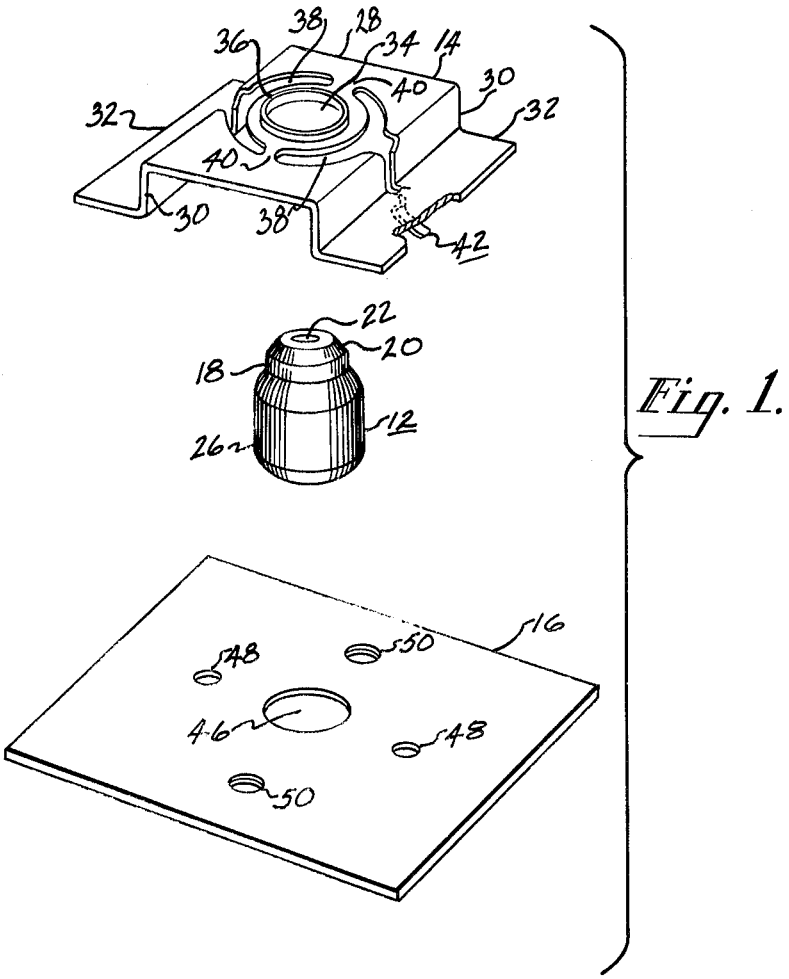

March 8, 1966 C. F. ROSE 3,239,287
SELF-ALIGNING BEARING ASSEMBLY
Filed Sept. 6, 1963 2 Sheets-Sheet 1

INVENTOR.
CHARLES F. ROSE
BY
ATTORNEY

March 8, 1966   C. F. ROSE   3,239,287
SELF-ALIGNING BEARING ASSEMBLY
Filed Sept. 6, 1963   2 Sheets-Sheet 2

INVENTOR.
CHARLES F. ROSE
BY
ATTORNEY

United States Patent Office 3,239,287
Patented Mar. 8, 1966

3,239,287
SELF-ALIGNING BEARING ASSEMBLY
Charles F. Rose, Indianapolis, Ind., assignor to Radio
Corporation of America, a corporation of Delaware
Filed Sept. 6, 1963, Ser. No. 307,231
5 Claims. (Cl. 308—72)

This invention relates to self-aligning bearing assemblies for shafts or the like, and more particularly to a self-aligning bearing that is useful for rotatably supporting the capstan of a tape recording and reproducing instrument.

When a recording is made on a tape, or when a tape recording is being reproduced, the tape is pulled past a transducer at a constant speed. The tape pulling device may comprise a rotatable shaft, having an upstanding cylindrical end, called a capstan. The shaft may extend through an upper bearing and at least partially through a lower bearing. A flywheel, which may have a belt receiving groove in the periphery thereof, may be mounted on the shaft between the bearings. A source of motive power, such as an electric motor, may drive the shaft at a constant speed by means of a belt engaging the belt receiving groove. The tape is pulled past the transducer by causing an idler pulley commonly known as a pressure roller to press the tape against the revolving capstan. Proper operation requires that the axis of the capstan be perpendicular to the path of the tape.

When a shaft is supported by two spaced bearings, they must be properly aligned to reduce binding of the shaft thereby. Careful alignment of bearings adds to the cost of the recording and reproducing instrument including the shaft. Furthermore, changes in temperature of, or abuse of, the instrument may destroy the alignment of the bearings. Use of self-aligning bearings eliminates the cost of alignment. Furthermore, the provision of self-aligning bearings, at least one of which is adjustable in position, permits adjusting the axis of the capstan so that it is perpendicular to the path of the tape and without causing the aforementioned binding. However, prior art self-aligning bearings are relatively complicated and expensive and they are, therefore, usually included only in relatively expensive recording and reproducing apparatus, if at all.

It is an object of this invention to provide means for aligning the axis of the capstan to be perpendicular to the path of the tape.

It is an object of this invention to provide a self-aligning bearing assembly requiring a minimum number of easily and quickly fabricated and easily and quickly assembled parts.

It is another object of this invention to provide a relatively simple and inexpensive self-aligning bearing which is easily and inexpensively mountable.

It is also an object of this invention to provide a self-aligning shaft holding assembly comprising a minimum number of inexpensively fabricated and assembled parts.

It is a further object of this invention to provide an improved self-aligning shaft holding assembly.

It is a still further object of this invention to provide an improved bearing clamp for a self-aligning bearing which engages a bearing plate more tightly in response to increasing forces tending to separate the clamp and the plate.

Yet another object of this invention is to provide an improved bearing clamp for a self-aligning bearing, which clamp can be mounted easily and which allows freedom of alignment of the bearing.

It is also an object of this invention to provide an improved self-aligning bearing assembly which is especially useful in apparatus such as tape recording and reproducing apparatus.

In accordance with one embodiment of the invention a three part bearing assembly is provided. One part comprises a generally spherical bearing member which has an axially extending bore therethrough for receiving a shaft, such as the capstan of a tape recording and reproducing instrument. The bearing member also includes a cylinder extending from its spherical surface and concentrically with the bore, the outside diameter of the cylinder being less than the diameter of the spherical portion of the bearing member. Secondly, the bearing assembly comprises a U-shaped bearing bracket of spring material having a hole through the web portion of the U that joins the legs thereof. The diameter of the hole through the bearing bracket is greater than the outside diameter of the cylinder and less than the diameter of the spherical portion of the bearing member. Thirdly, the bearing assembly includes a bearing plate having a hole therethrough of a diameter less than the diameter of the spherical portion of the bearing member. In assembling the self-aligning bearing assembly, the bearing member is seated in the hole in the bearing plate, that is, a portion of the spherical surface of the bearing member is placed in contact with an edge of the hole in the bearing plate, with the cylindrical extension of the bearing member extending away from the bearing plate. The bearing bracket is so placed that a spherical portion of the bearing member surrounding the cylinder is received in the hole in the bracket. The bearing bracket is fixed to the bearing plate and the bracket urges the bearing member resiliently towards the bearing plate. Due to the contact of the spherical portions of the bearing member on the bracket and the plate, a limited universal mounting is provided for the bearing member. The contact of the periphery of the cylinder with the inside of the hole through the bracket limits the extent of the universal motion. Therefore, an angular movement of a shaft extending through the bore in the bearing member will cause similar angular movement of the bearing member, whereby a self-aligning, shaft-supporting device or bearing is provided. A bearing plate may be moved with respect to a support therefor for aligning the axis of the capstan so that it will be perpendicular to the path of the tape.

Resilient portions of the bearing bracket provide inter-engagement between the bearing bracket and the bearing plate to hold the bearing assembly in its assembled position.

A portion of the bracket may be cut away to decrease the stiffness of the web portion of the bracket and to provide a spider for receiving a spherical portion of the bearing member, so that flexing the bracket web does not substantially distort the portion of the bracket that contacts the bearing member. The material of the bracket may be formed into a cylindrical neck having an inside diameter suitable for contacting a spherical portion of the bearing member.

Figure 2:
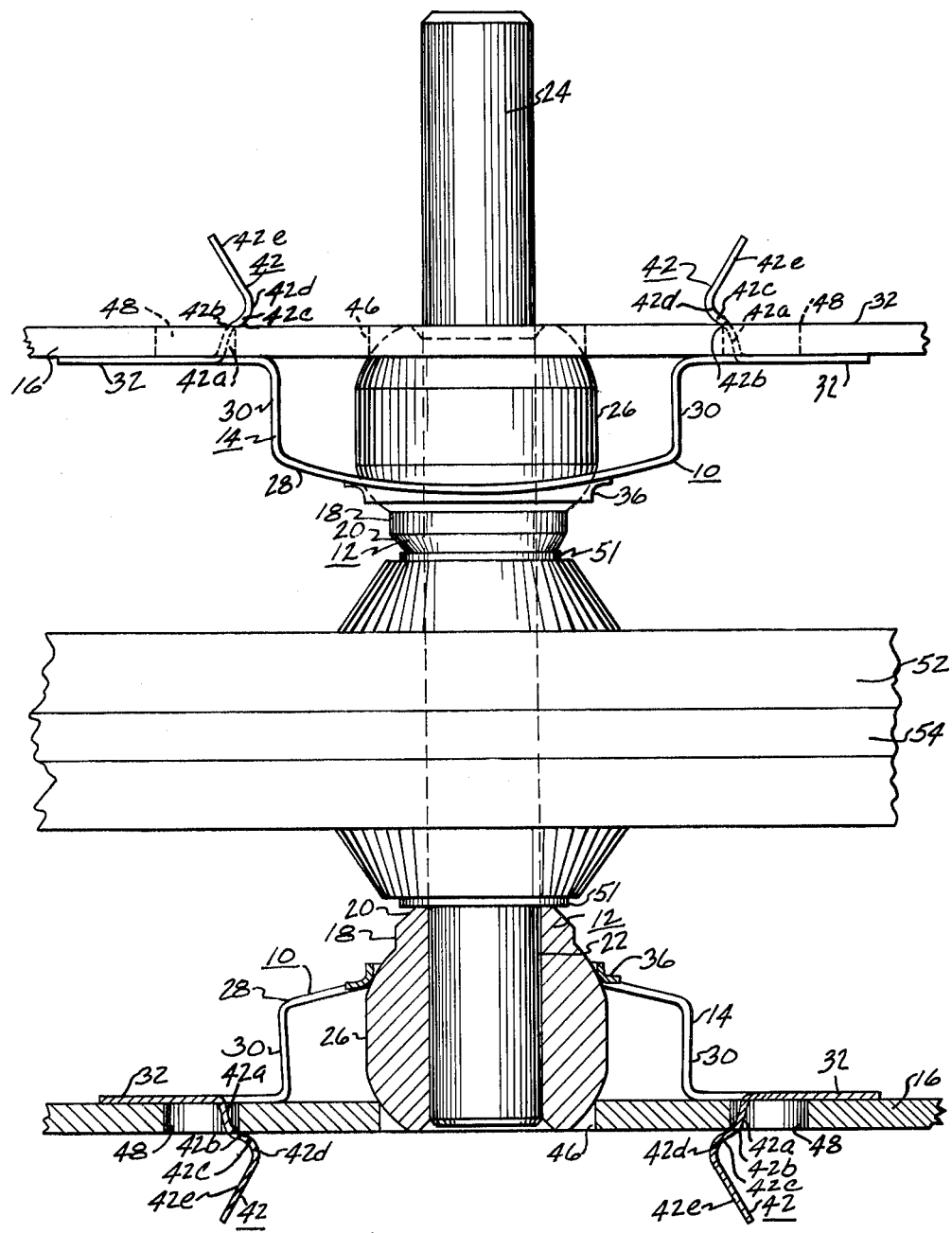

The novel features of the invention, both as to its organization and method of operation and assembly, as well as additional objects and advantages thereof, will be understood more readily from the following description, when read in conjunction with the accompanying drawing, in which:

FIG. 1 is an exploded, perspective view of one form of bearing bracket, bearing member and bearing plate according to this invention; and, FIG. 2 is a view, partially in cross-section, of a capstan and a flywheel therefor mounted in bearing assemblies such as shown in FIG. 1.

The bearing assembly 10 consists of three parts, viz., a bearing member 12, a bearing bracket 14, and a bearing plate 16.

The bearing member 12 comprises a generally spherical body portion having a circular cylinder 18 extending therefrom. The end of the cylinder 18 may be formed with a beveled edge or chamfer 20. A circular bore 22 of a size to receive a shaft 24 (FIG. 2) extends through the bearing member 12 coaxially with the axis of the cylinder 18. The bearing member 12, which may be made by powdered metal processes, may have an intermediate portion 26 of cylindrical shape and coaxial with the cylinder 18.

The bearing bracket 14 may be made of sheet spring material by known sheet metal cutting and forming techniques. The bearing bracket 14 is generally of U shape, having a web 28 connecting its legs 30. Feet 32 extend in opposite directions from the ends of legs 30. A hole 34 is provided centrally of the web 28 and the material of the web 28 surrounding the hole 34 may be shaped to form a cylindrical collar 36. The inside diameter of the collar 36 is greater than the outside diameter of the cylinder 18 of the bearing member 12, and is less than the outside diameter of the intermediate portion 26. Some of the material of the web 28 is cut away to provide apertures or cut-outs or openwork 38 partially surrounding the hole 34 (FIG. 1), whereby the part of the web between the cut-outs 38 and the hole 34, including the collar portion 36, is attached to the web 28 by narrow tongues 40 providing a spider-like arrangement. The flexing of the web 28, therefore, applies little flexing stress to the collar 36, as will be further explained below.

The bearing bracket 14 also includes a pair of spring fingers 42 (see particularly FIG. 2). The spring fingers 42 extend, for a first portion 42a of their lengths generally perpendicularly to the feet 32 and downwardly away from the legs 30. The spring fingers 42 then have bends 42b to provide second portions 42c which extend toward each other. At the ends of the portions 42c, the spring fingers 42 have other bends 42d to provide final portions 42e which extend away from each other at an an acute angle. The function of the fingers will be described hereinbelow.

The bearing plate 16 may be a structural member of the instrument embodying the herein described, self-aligning shaft holding means 10, as indicated in FIG. 2, or it may comprise a separate plate, as shown in FIG. 1. Where a separate plate 16 is used, it may be adjusted in position with respect to a structural member of the instrument, whereby the axis of the capstan 24 may be tilted to be perpendicular to the path of the tape. A circular hole 46 having a diameter intermediate that of the shaft 24 and the intermediate portion 26 of the bearing member 12 is provided through the bearing plate 16 and serves as a seat for the lower, spherically surfaced end of the bearing member 12, as seen in the lower portion of FIG. 2. Two other holes 48, positioned and dimensioned to receive fingers 42, are provided in the bearing plate 16. The bearing plate 16 may have threaded holes 50 therethrough to facilitate mounting the bearing plate 16 on a support (not shown).

In assembling the bearing assembly, a spherical end of the bearing member 12 extends into and is seated in the hole 46 of the bearing plate 16, so that the cylinder 18 extends away from the bearing plate. The bearing bracket 14 is then placed over the cylinder 18 and is so positioned that the collar 36 contacts the opposing spherical portion of the bearing member 12. In this position of the plate and bracket, the hole 46 and the hole 34 are axially aligned. The bearing bracket 14 is then forced towards the bearing plate 16 until the spring fingers 42 enter the holes 48. Continued motion of the bearing bracket 14 towards the bearing plate 16 causes flexing of the spring fingers 42 away from each other by reason of engagement of the final, angular portions 42e thereof with the edges of the respective holes 48. When the bends 42d have passed the plate 16, the resilient fingers 42 snap back toward each other and the portions 42c thereof engage the under surface of the bearing plate 16 to securely, but releasably, lock the assembly of the bearing member 12 and the bracket 14 on the plate 16. The diameter of the spherical portions of the bearing member 12, the inside diameters of the collar 36 and the hole 46, and the lengths of the legs 30 of the bracket 14 are so proportioned that the web 28 is resiliently flexed in a direction perpendicular to the plane thereof, as shown in FIG. 2. Thereby, the web 28 resiliently presses the bearing member 12 towards the bearing plate 16, although permitting angular adjustment of the member 12 with respect to the bracket 14 and the plate 16. Furthermore, this flexing of the web 28 tends to draw the fingers 42 toward each other whereby the fingers 42 grip the portion of the plate 16 therebetween more tightly than when the web 28 is not flexed. However, due to the fact that the collar 36 is attached to the web 28 by the spider comprising the narrow tongues 40 extending parallel to the legs 30 and perpendicular to the direction of flexing of the web 28, little flexing stress is applied to the collar 36, and the collar is not distorted to any substantial extent.

FIG. 2 illustrates one use of the herein described bearing assembly 10. The upper and lower plates 16 (as viewed in FIG. 2) may comprise support plates of a tape recording and reproducing instrument. A flywheel 52, having a peripheral groove 54 for receiving a drive belt, is mounted on the shaft 24 between the upper and lower bearing assemblies 10. Thrust washers 51 may be provided between the flywheel 54 and the bearing members 12. The upper end of the shaft 24 may comprise a capstan of the instrument. Assembly of the self-aligning bearings 10 with the shaft 24 and the plates 16 is accomplished quickly and easily and with little skill or care.

Although a single bearing or shaft holding assembly has been described, it will undoubtedly be apparent to those skilled in the art that variations thereof are possible within the spirit of this invention. For example, one self-aligning bearing may be used instead of two, or one or more self-aligning bearings may be used with a fixed bearing; or the hole in the bearing member 12 may be threaded to receive a threaded shaft, rod, or bolt, thereby to provide a universal type of mounting for the threaded shaft. The cylinder 18 may extend through the hole 46 in the plate 16 instead of as shown, if desired. Other variations will, no doubt, readily suggest themselves to those skilled in the art. Hence, it is desired that the above-described bearing or shaft holding assembly be considered as illustrative and not in a limiting sense.

What is claimed is:

1. A self aligning bearing assembly comprising a bearing plate having a plurality of holes therethrough, a bearing bracket of generally U shape, said bearing bracket having a hole in the web connecting the legs thereof and circularly extending cut-outs partially surrounding said last named hole, said cut-outs leaving narrow tongues of material extending along said web parallel to said legs, a bearing member having spherical surface portions, one said spherical portion of said bearing member extending into a first one of said holes in said plate, another said spherical portion of said bearing member extending into said hole in said bracket, a pair of fingers extending from said bracket and through said other holes in said plate and engaging said plate, the diameters of the holes into which the bearing member extends and of the spherical portion of said bearing member and the length of said legs being so proportioned that said bearing member is resiliently held between said bracket member and said plate by resilient flexing of said web with the ends of said legs contacting said plate, said tongues being so narrowed that substantially no distortion of the material of the web between said cut-outs and said hole takes place upon flexing of said web.

2. A self aligning bearing assembly comprising a bearing plate having a plurality of holes therethrough, a resilient bearing bracket of generally U shape, said bearing bracket having a hole in the web connecting the legs thereof, a bearing member having spherical surface portions, one said spherical portion of said bearing member extending into a first one of said holes in said plate, another said spherical portion of said bearing member extending into said hole in said bracket, a pair of fingers extending from said bracket member, a first portion of each of said fingers extending through respective other said holes in said plate, a second portion of each of said fingers extending towards each other and engaging said plate, the diameters of the holes into which said bearing member extends and of the spherical portion of said bearing member and the length of said legs being so proportioned that said bearing member is resiliently held between said bracket member and said plate by resilient flexing of said web with the ends of said legs contacting said plate, said flexing tending to bring said fingers closer together to more tightly engage said plate.

3. A self aligning bearing assembly comprising a bearing plate having a plurality of holes therethrough, a resilient bearing bracket of generally U shape, said bearing bracket having a hole in the web connecting the legs thereof and cut-outs partially surrounding said last named hole, a bearing member having spherical surface portions, one said spherical portion of said bearing member extending into a first one of said holes in said plate, another said spherical portion of said bearing member extending into said hole in said bracket, a pair of fingers extending from said bracket member, a first portion of each of said fingers extending through respective other said holes in said plate, a second portion of each of said fingers extending towards each other and engaging said plate, the diameters of the holes into which said bearing member extends and of the spherical portion of said bearing member and the length of said legs being so proportioned that said bearing member is resiliently held between said bracket member and said plate by resilient flexing of said web with the ends of said legs contacting said plate, said flexing tending to bring said fingers closer together to more tightly engage said plate, said cut-outs preventing substantial distortion of the material of the web between said cut-outs and said hole upon flexing of said web.

4. A self aligning bearing assembly comprising a bearing plate having a hole therethrough, a resilient bearing bracket portion spaced from said plate and having a hole therethrough, said bracket portion also having circulating extending apertures therein between the ends thereof partially surrounding said last mentioned hole, said apertures leaving narrow tongues connecting the material surrounding said hole in said bracket portion and the other material of said bracket portion, a bearing member having opposed spherical surface portions, said opposed spherical portions of said bearing member extending respectively into said holes in said plate and in said bracket portion, whereby a part of said bracket portion surrounding the hole therein contacts said bearing member, and means for so closely holding the ends of said bracket portion to said plate that said bearing member causes said bracket portion to flex, said tongues extending in a direction perpendicular to the direction between said ends, whereby said apertures substantially reduce deformation of the part of said bracket between said apertures and said hole therethrough when said bracket portion is flexed.

5. A self-alignable bearing assembly comprising, in combination,
 (a) a bearing plate having a hole therein,
 (b) a resilient bearing bracket also having a hole therein, there being cut-outs in said bracket partially surrounding said hole therein and leaving narrow tongues of material connecting the material surrounding said hole in said bracket and the other material of said bracket, said tongues being aligned and extending in a given direction, said bracket being spaced from said plate and said holes being substantially axially aligned with each other,
 (c) a bearing having opposed hole engaging portions formed on spherical surfaces
  (1) one of said spherical surface portions being seated in said bearing plate hole,
  (2) the other of said spherical surface portions being received in said bracket hole, and
 (d) resilient means coupling said plate and said bracket to each other whereby to lock said bearing between said plate and said bracket but with a force permitting said bearing to adjust itself within said holes by reason of said spherical surfaces thereof, said resilent means applying flexing moment to said bracket along lines in a direction extending perpendicular to said given direction, said cut-outs substantially preventing application of said flexing moment to said material surrounding said hole in said bracket.

References Cited by the Examiner

UNITED STATES PATENTS

| | | | |
|---|---|---|---|
| 2,011,493 | 8/1935 | Larsh | 308—72 |
| 2,138,659 | 11/1938 | Kindig | 308—26 |
| 2,621,088 | 12/1952 | Cole | 308—72 |
| 3,014,767 | 12/1961 | Thrasher et al. | 308—72 |

FOREIGN PATENTS 864,927  4/1961  Great Britain.

DON A. WAITE, *Primary Examiner.*
FRANK SUSKO, *Examiner.*